United States Patent Office 3,446,828
Patented May 27, 1969

3,446,828
PROCESS FOR MAKING ALUMINUM ALKOXIDES AND SEPARATION OF IMPURITIES THEREFROM
August J. Buzas, Bethleham, and Remsen T. E. Schenck, Bangor, Pa., assignors to Keystone Chemurgic Corporation, Bethlehem, Pa., a corporation of Pennsylvania
Filed Feb. 9, 1965, Ser. No. 431,397
Int. Cl. C07f 5/06
U.S. Cl. 260—448                         3 Claims

ABSTRACT OF THE DISCLOSURE

A process is described for the separation of pure aluminum alkoxide from the impurities resulting from the reaction of metallic aluminum and the corresponding alcohol. The process includes the steps of maintaining the reaction mixture at a temperature slightly below the boiling point of the alcohol while allowing the impurities to settle from the reaction product and then decanting the alkoxide in alcohol solution. A further embodiment of the process includes the step of maintaining an ambient temperature about the reaction vessel slightly below the boiling point of the alcohol. A further embodiment includes the step of introducing sufficient excess alcohol to limit the alkoxide product of the reaction to about 50% of the total solution.

---

Figure 1:
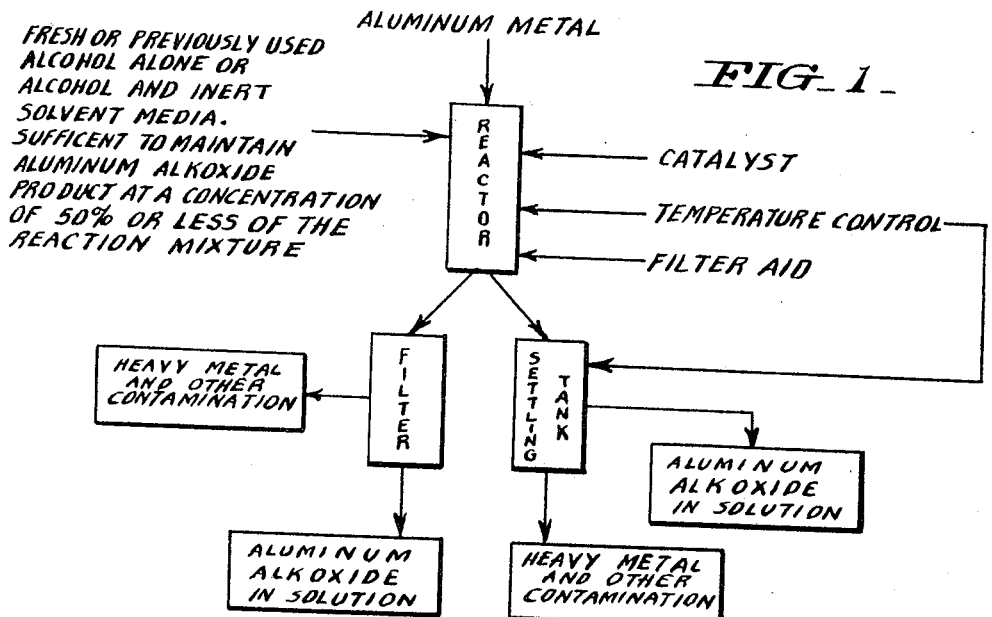

This invention relates to an improved apparatus and process for the preparation of substantially pure aluminum alkoxides. More particularly, this invention relates to a process for the production of aluminum alkoxides from metallic aluminum and an alcohol and to improved apparatus and process for separating the aluminum alkoxides or alcoholates so produced.

Aluminum alkoxides have been prepared in the past by the reaction between anhydrous aluminum chloride and a solution of ammonia, or of a sodium alkoxide, in the corresponding alcohol. Several disadvantages are inherent in this method. Heavy precipitates of ammonium or sodium chloride must be separated from the product in order to obtain a substantially pure aluminum alkoxide. A more serious disadvantage is produced by the tendency of the anhydrous aluminum chloride to react with solvent alcohol, forming by-products such as olefins, alkyl chlorides and ethers.

This process has been largely supplanted by an improved procedure in which metallic aluminum reacts directly with an alcohol to form hydrogen and the corresponding aluminum alcoholate. This reaction is catalyzed by small amounts of mercuric halide, elemental iodine, or preformed aluminum alkoxide. Metallic aluminum in almost any form is usable, as scrap metal enters into the reaction as readily as virgin ingots.

It has heretofore been assumed that aluminum alkoxides thus prepared from metallic aluminum must be distilled. This distillation was believed necessary because of the presence of heavy metal contaminants and of aluminum oxide. The latter results from the presence of traces of moisture in the reactants. The former contaminants are derived from the catalyst and from the metallic aluminum. Even the purest of commercial aluminum (e.g., grade 1175) contains up to about 0.15% iron and 0.10% copper, while the common structural alloys (such as grade 6061) may contain as much as 0.70% iron, 0.40% copper, 0.15% manganese and 0.35% chromium. All of these materials precipitate as a black sludge when the aluminum undergoes reaction. The aluminum alkoxides intended to be used as raw materials for the preparation of pharmaceuticals, and as intermediates in certain industrial syntheses, must be free from this heavy metal contamination.

Distillation of aluminum alkoxides to obtain a pure product requires special equipment because many of the alkoxides are volatile only at relatively high temperatures and relatively low pressures. Furthermore, the sensitivity of the aluminum alkoxide to water demands the exclusion of all traces of atmospheric moisture. An additional difficulty is the fact that some aluminum alkoxides sublime easily and have only a short temperature interval between the melting point and boiling point under reduced pressure. This physical characteristic of many of the aluminum alkoxides results in a tendency for the sublimate to clog the restricted passages of conventional distillation equipment.

It is therefore an object of this invention to provide a process for the production of an aluminum alkoxide from metallic aluminum and a suitable alcohol wherein the aluminum alkoxide is recovered in essentially pure form without the necessity of distillation.

It is also an object of this invention to provide a process for the separation of the contamination normally present in aluminum alkoxides when produced by the reaction of an alcohol and metallic aluminum in the presence of a catalyst.

It is a further object of this invention to provide separation apparatus which will effectively remove essentially all of the heavy metal impurities normally resulting from the reaction between metallic aluminum and alcohol in the production of aluminum alkoxides.

The above and further objects of this invention, which will be apparent from the description contained herein, are uniquely accomplished by the processes and apparatus of this invention.

It has been discovered that various aluminum alkoxides will remain in solution during the reaction of metallic aluminum and a suitable alcohol when the concentration of aluminum alkoxide product in the reaction mixture is maintained at about 50% by weight or below. It has further been discovered that the traces of heavy metals, which are present in the metallic aluminum reactant and in various catalysts suitable for use in the reaction, and aluminum oxide are effectively completely insoluble in such a solution of aluminum alkoxide in alcohol or an indifferent solvent. The initial state of the heavy metal contaminants, i.e., whether they are alloyed with the aluminum or are introduced as the metal or in compound form for catalytic purposes, is immaterial, as they are reduced to their respective free metals during the course of the reaction. As the free metal they are not appreciably soluble in organic media. Also, by restricting the concentration of aluminum alkoxide in the reaction mixture to about 50% or below the viscosity and density of said solution remain comparatively low. The resultant insoluble particles of heavy metal contaminants and aluminum oxide are then readily separated from such low viscosity, low density solutions by decantation or filtration.

In this manner it has been established that distillation may be dispensed with as a necessary process step in the process of preparing essentially pure aluminum alkoxides, thereby reducing the cost of their manufacture.

Figure 2:
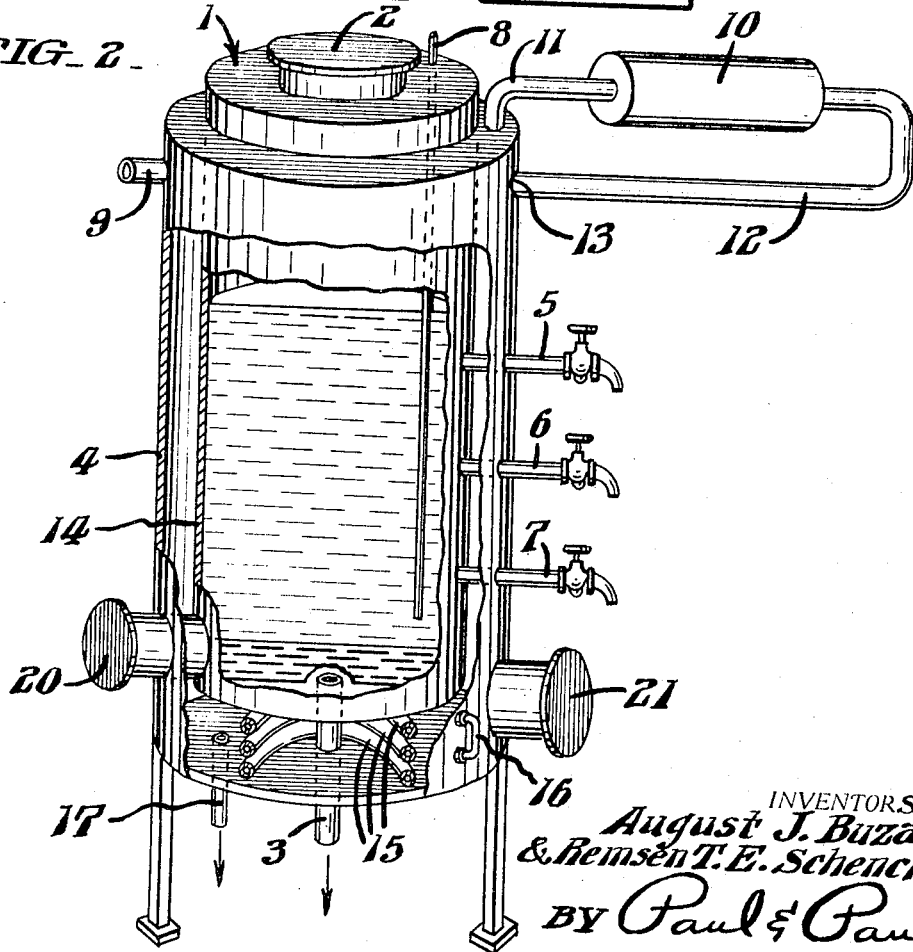

Referring to the drawings:
FIGURE 1 is a schematic flow diagram of the reaction process for the production and separation of substantially pure aluminum alkoxides of this invention.
FIGURE 2 is a partially broken away, perspective illustration of a decantation separation apparatus of this invention.

The preferred aluminum alkoxides which can be produced according to this process as shown in FIGURE 1, are metallo-organic compounds of the type having the general formula $Al(OR)_3$, wherein R stands for a low molecular weight straight or branched aliphatic hydrocarbon chain. These compounds are characteristically white solids with melting points above 100° C. and relatively high boiling points. They react readily with substances containing acidic hydrogen atoms, and are thus useful as intermediates in the preparation of a variety of aluminum compounds possessing properties valuable in industrial and pharmaceutical applications.

The reaction between metallic aluminum and a lower aliphatic primary or secondary alcohol, once it has been induced, is initially brisk. As the aluminum alkoxide product accumulates in solution in the unreacted alcohol or other solvent, however, it reduces the activity of the alcohol, and the reaction proceeds at a decreasing rate. If the reaction is allowed to proceed in this manner, the rate of reaction will eventually become negligible. It is thus effectively impossible to convert aluminum and an alcohol quantitatively to the corresponding aluminum alkoxide in stoichiometric proportions, even while using an excess of the metallic aluminum.

The process of this invention, however, contemplates the use of a substantial excess of alcohol. The reaction thus proceeds at a conveniently rapid pace to completion resulting in a solution of aluminum alkoxide in an excess of the alcohol. The product may then be separated into its components by filtration or decantation.

Of utmost importance in the process of this invention is the fact that the aluminum alkoxide product is soluble in the corresponding alcohol or other indifferent hydrocarbon solvent, when it is present in the total volume or solvent in concentrations of up to about 50% by weight aluminum alkoxide only at elevated temperatures. It is therefore necessary, in carrying out the removal of aluminum oxide and heavy metals by decantation or filtration, to maintain the temperature of the system near the boiling point of the solvent. It is of course also necessary that the separation be carried out in the absence of atmospheric moisture.

An additional advantage in the use of the process and apparatus of this invention is the lack of necessity for the initial reactants to be completely anhydrous. The aluminum oxide formed alumina crystals in the process of this invention, tends to settle comparatively rapidly from the reaction solution, aiding the subsequent separation steps of the process.

Heavy metals precipitated by the dissolution of aluminum alloys in the reaction are commonly liberated in an extremely finely divided state. In spite of the fact that these particles are denser than the reaction medium, they tend to settle slowly and normally pass freely through the pores of ordinary filters.

The aluminum oxide incidentally formed thus serves to promote separation by acting as an efficient flocculation agent for the metal particles carrying them along as it settles from the reaction media. In addition, the aluminum oxide forms a fine-pored bed on normal filtration separation apparatus thereby promoting further separation of the heavy metal contaminants. If the reactants used are sufficiently anhydrous to prevent the formation of an effective amount of alumina for efficient clarification, it is desirable to supplement the reaction media either by the addition of a small amount of a standard filter aid, such as diatomaceous earth, or the addition of small amounts of water.

As can be seen from the foregoing description of this invention, decantation is especially well-suited as a separation technique in its practice.

The decantation separation apparatus shown in FIGURE 2 is particularly well-suited for use in the process of this invention.

The settling tank 1 is provided with an inner container 14 having an inlet 2, and outlet 3 and an outer jacket 4. Sampling tubes 5, 6 and 7 project through the outer jacket 4 so as to come in contact with the liquid contained within the inner container 14. The settling tank is further provided with a thermocouple well 8, which is adapted for accurately reading the temperature of the solution contained within the inner container 14.

The reaction mixture enters the inner container 14 through the inlet 2 from the reactor, shown schematically in FIGURE 1. The aluminum alkoxide product must be present in solution in a concentration not greater than about 50% by weight.

For economy of operation a greater amount of aluminum alkoxide product can of course be recovered if the temperature employed is as near to the boiling point of the solvent as it is practical to obtain. The separation vessel of this invention is uniquely adapted for maintaining the crude reaction solution at a constant temperature which is very near the boiling point of the particular solvent selected.

The space between the inner container 14 and the outer jacket 4 is adapted to contain either the same alcohol as employed in the aluminum alkoxide reaction or an indifferent hydrocarbon solvent in which the aluminum alkoxide reaction was conducted.

Reflux condenser 10 is adapted by means of pipes 11 and 12 to receive the vapors of the boiling liquid contained between the inner container 14 and the outer jacket 4. The space at inlet 13. The heat to maintain a refluxing temperature for the liquid contained between the inner container 14 and the outer wall 4 is supplied by any convenient source such as the steam coils shown at 15.

Sight glass 16 is provided to check the level of the liquid, so as to insure that the liquid present covers the steam tubes 15. Manhole 20 communicates through the outer wall 4 and into the inner container 14 providing access for periodic maintenance and cleanout of the sludge which will form in the bottom of the inner container 14.

Manhole 21 communicates with the space between the jacket 4 and the inner container 14 providing access to the steam coils for maintenance and repair. Inlet 9 and outlet 17 are employed for charging and evacuating respectively the space between inner container 14 and outer jacket 4 with the preferred amount of liquid to be used.

During operation, the space between inner container 14 and outer jacket 4 is charged with the preferred liquid in an amount sufficient to cover the steam coils 15, as viewed through sight glass 16. The liquid, preferably the same as the solvent or alcohol used in the reactor is then continuously boiled permitting the vapors to fill the space between jacket 4 and inner container 14 thereby surrounding its outer wall with vapor at the temperature at which the preferred liquid boils. The vapors are then condensed in reflux condenser 10 and returned to same space where they will return to the boiling solution surrounding steam coils 15.

In this manner the aluminum alkoxide in solution within the inner container 14 is subjected to a substantially uniform temperature throughout its entire volume. This condition prevents the formation of convection currents within the reaction mixture thereby enhancing the settling out of any insoluble particulate contaminants such as filter aid, aluminum oxide and free metal formed during the reaction.

After sufficient time at rest, the products sampled at pipes 5, 6 and 7 will yield a solution of aluminum alkoxide in the preferred solvent substantially free of impurities. The solution may then be used directly in processes which involve the reaction of aluminum alkoxides in solution. If a solid product is desired, solvates of various aluminum alkoxides may be formed which will be insoluble in various solvents and can therefore be recovered after precipitation. A dry product can be recovered by standard drying techniques.

The heavy metal and other contaminants separated by this apparatus may be withdrawn through outlet 3, and the settling tank may then be recharged through inlet 2, to repeat the separation on a new reaction mixture.

The following examples are indicative of specific aluminum alkoxides which may be produced according to the process and in the apparatus of this invention.

The following examples all follow the general process illustrated schematically in the flow diagram shown in FIGURE 1.

EXAMPLE 1

A reaction vessel provided with a reflux condenser is charged with 27 gm. of degreased metallic aluminum ingots or scrap. Anhydrous isopropanol is charged into the reaction vessel in an amount sufficient to cover the aluminum metal. In this example, 50 cc. of 99+% dry isopropanol is added together with a catalyst. The catalyst chosen may be either aluminum isopropoxide or a mercuric halide. If aluminum isopropoxide is used, 10 gm. is sufficient, while 50 mg. each of mercuric chloride and iodine crystals is equally effective. The mixture is then warmed gently to near the boiling point of isopropanol to initiate the reaction. After initiation a brisk evolution of hydrogen occurs with the simultaneous formation of gray or black turbidity in the reaction mixture.

Once the reaction has started satisfactorily, further heat is unnecessary and the reaction is allowed to proceed unassisted. Due to the exothermic nature of the reaction, it is sometimes desirable to provide the reaction vessel with means for cooling the reaction as well as heating.

When the initial reaction has moderated, an additional 400 cc. of isopropanol is added slowly at a rate sufficient to keep the mixture boiling actively but not violently. After the addition is complete, external heat is reapplied to maintain the mixture at reflux temperatures until all the aluminum has reacted and no further hydrogen is evolved.

The hot reaction mixture can then be stirred with the addition of 5 gm. of finely divided filtration aid to form a uniform suspension. This suspension is then transferred to a vessel preferably of the type shown in FIGURE 2 where it is maintained, with the exclusion of the atmosphere, at a temperature just under the boiling point of isopropanol.

When sufficient time has elapsed for settling, the clear supernatant liquid is decanted and there is obtained 400–425 cc. of a solution of aluminum isopropoxide in isopropanol as a pale yellow liquid. The recovered liquid contains between 90% and 95% by weight of the aluminum charged in the reactor. The heavy metal content of the aluminum isopropoxide thus formed is less than 25 parts per million parts of aluminum isopropoxide (the heavy metal content is determined as Pb). It has been determined that 25 parts per million is the high level of heavy metal contamination experienced even when scrap aluminum alloys containing several percent of iron, copper, manganese, lead, chromium, and the like are used. When pure aluminum (99.75%) is utilized in the reactor, the aluminum isopropoxide product contains less than 10 p.p.m. of heavy metal contamination.

As previously stated this solution of aluminum isopropoxide product in isopropanol is suitable for use directly in processes where subsequent reactions can take place directly in the isopropanol solvent. A more dilute solution may of course be prepared by adding more anhydrous isopropanol or even anhydrous nonpolar solvents such as toluene and xylene.

If pure aluminum isopropoxide is desired, it may be obtained without distillation by allowing the solution to cool slowly, whereupon aluminum isopropoxide crystallizes as granular crusts. When crystallization is complete the mother liquor is drained off to be recycled to the reactor and the solid is dried in a current of warm dry air.

EXAMPLE 2

The procedure according to Example 1 may be followed using a total of 550 cc. of n-butanol and holding the separation apparatus at a temperature just under the boiling point of n-butanol. The product obtained is 500–525 cc. of a 50% solution of aluminum n-butoxide in butanol. The product obtained also contains less than 25 parts per million parts of aluminum n-butoxide of heavy metal contamination determined as Pb.

EXAMPLE 3

Following the procedure of Example 1, 550 cc. of isobutanol is utilized and the sedimentation vessel is maintained at a temperature just under the boiling point of isobutanol. The product obtained is 500–525 cc. of a 50% solution of aluminum isobutoxide in isobutanol, again containing less than 25 parts of heavy metal contamination determined as Pb per million parts of aluminum isobutoxide.

EXAMPLE 4

The procedure of Example 1 is followed using the total of 650 cc. of isoamyl alcohol with the separation vessel held at a temperature just under the boiling point of isoamyl alcohol. The product obtained is 600–625 cc. of a 50% solution of aluminum isoamyloxide in isoamyl alcohol. The product again contained less than 25 parts per million of heavy metal contamination per million parts of aluminum isoamyloxide.

EXAMPLE 5

The reaction vessel is charged with 30 gm. of degreased aluminum pellets or scrap which is covered with 250 cc. of xylene, which is then heated to its boiling point. Absolute ethanol containing 100 mg. each of mercuric chloride and iodine crystals is added to the xylene with stirring. The reaction is initiated with a small amount of ethanol, the balance of the ethanol being added slowly after the pace of the reaction has slackened. As in Example 1 the reaction vessel is fitted with a reflux condenser and the ethanol is added at a rate sufficient to promote gentle refluxing. After all the ethanol has been added, stirring and refluxing is continued until hydrogen is no longer evolved. At this point 5 gm. of filter aid is stirred into the black suspension, and the resulting slurry is decanted from the excess aluminum into a separation apparatus maintained at 120°–130° C. After the suspended solids have settled completely, the clear yellow supernatant liquid is decanted from the dark sludge.

The product thus formed is 375–400 cc. of a solution containing 40–45% of aluminum ethoxide in xylene. The product contains less than 10 parts of heavy metal contamination (determined as Pb) per million parts of aluminum ethoxide.

The solution may be used directly in processes which involve the reaction of aluminum ethoxide in the presence of an aromatic solvent. If a solid product is desired, the hot xylene solution is stirred while adding slowly an additional 58 cc. of absolute ethanol. This addition forms a solvate of aluminum ethoxide which is insoluble in xylene and which therefore precipitates. The resulting slurry is cooled and the xylene is separated, out of contact with the atmosphere, from the granular white solid product which is then dried.

EXAMPLE 6

The procedure of Example 5 is followed, using 224 cc. of anhydrous n-propanol. The product formed is 425–450 cc. of 45%–50% aluminum n-propoxide in xylene. The product contains less than 10 parts heavy hetal contamination, determined as lead, per million parts of aluminum n-propoxide. The same procedure may be employed, with the addition of a further 72 cc. of n-propanol, if a solid product is desired.

While this invention has been described in terms of representative examples, it should be understood that it is not limited to those example. Other lower aliphatic primary and secondary alcohols, such as 2-butanol, 1-pentanol, 2-pentanol, and the like may be substituted for those shown in the examples. An indifferent solvent may be used with any such alcohol employed. It will be understood by those skilled in the art, that clarification of the product in solution may be achieved by either the use of specialized separation apparatus disclosed or by conventional separation techniques other than distillation. A solid aluminum alkoxide product may be obtained as a precipitate or solvate where possible, when desired. These and other modifications are possible with this invention which will be obvious to one skilled in the art without departing from the spirit of the invention as hereinbefore described or from the scope of the appended claims.

We claim:

1. A process for the production of an aluminum alkoxide of the type $Al(OR)_3$, wherein R is an alkyl group containing from two to six carbon atoms which is substantially free of heavy metal contamination, comprising the steps of contacting aluminum metal in the presence of a catalyst with an alcohol of the type R'OH, wherein R' is the same as R, initiating a reaction between said aluminum and said alcohol, continuing the addition of said alcohol until the reaction is complete, adding said alcohol in excess to the reaction mixture in an amount sufficient to reduce the concentration of aluminum alkoxide product to about 50% of the total solution, and separating said aluminum alkoxide solution from said mixture at a temperature slightly below the boiling point of said alcohol.

2. A process for the separation of impurities from the aluminum alkoxide reaction product contained in a mixture formed by the reaction of metallic aluminum and an alcohol of the type ROH, wherein R is an alkyl group containing from two to six carbon atoms, comprising the steps of maintaining the aluminum alkoxide reaction product at a concentration of not more than about 50 percent by weight of the reaction product, maintaining said mixture at a temperature slightly below the boiling point of said alcohol while allowing said impurities to settle from said mixture, and then decanting a solution of said aluminum alkoxide reaction product and said alcohol from said mixture.

3. A process for the separation of impurities from the aluminum alkoxide reaction product contained in a mixture formed by the reaction in inert solvent of metallic aluminum and an alcohol of the type ROH wherein R is an alkyl group containing from two to six carbon atoms, comprising the steps of maintaining the aluminum alkoxide reaction product at a concentration of not more than about 50 percent by weight of the mixture, maintaining said mixture at a temperature slightly below the boiling point of said inert solvent while allowing said impurities to settle from said mixture, and then decanting a solution of said aluminum alkoxide reaction product and said solvent from said mixture.

References Cited

UNITED STATES PATENTS

| | | |
|---|---|---|
| 1,857,810 | 5/1932 | Gee _____ 210—71 XR |
| 2,579,251 | 12/1951 | Coates et al. |
| 2,636,865 | 4/1953 | Kimberlin. |
| 2,666,076 | 1/1954 | Rex et al. |
| 2,687,423 | 8/1954 | Mesinow. |
| 2,845,447 | 7/1958 | Carlson et al. |
| 2,965,663 | 12/1960 | Smith et al. |

HELEN M. McCARTHY, *Primary Examiner.*

H. M. S. SNEED, *Assistant Examiner.*

U.S. Cl. X.R.

23—272.6